(12) United States Patent
Ota (10) Patent No.: US 9,141,627 B2
(45) Date of Patent: Sep. 22, 2015

(54) PROVIDING A USER ACCESS TO DATA FILES DISTRIBUTED IN A PLURALITY OF DIFFERENT TYPES OF USER DEVICES

(75) Inventor: Takaaki Ota, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1357 days.

(21) Appl. No.: 11/528,233

(22) Filed: Sep. 26, 2006

(65) Prior Publication Data

US 2008/0077594 A1  Mar. 27, 2008

(51) Int. Cl.
*G06F 17/30* (2006.01)

(52) U.S. Cl.
CPC .............................. *G06F 17/30094* (2013.01)

(58) Field of Classification Search
None
See application file for complete search history.

(56) References Cited

U.S. PATENT DOCUMENTS

| | | | |
|---|---|---|---|
| 5,574,898 A * | 11/1996 | Leblang et al. | 707/1 |
| 5,724,575 A | 3/1998 | Hoover et al. | |
| 5,794,254 A | 8/1998 | McClain | |
| 5,909,689 A * | 6/1999 | Van Ryzin | 707/203 |
| 5,948,062 A * | 9/1999 | Tzelnic et al. | 709/219 |
| 5,960,446 A * | 9/1999 | Schmuck et al. | 707/205 |
| 6,119,151 A | 9/2000 | Cantrell et al. | |
| 6,421,717 B1 | 7/2002 | Kloba et al. | |
| 6,662,198 B2 | 12/2003 | Satyanarayanan et al. | |
| 6,820,088 B1 | 11/2004 | Hind et al. | |
| 2001/0044798 A1 * | 11/2001 | Nagral et al. | 707/102 |
| 2002/0046232 A1 | 4/2002 | Adams et al. | |
| 2002/0087476 A1 * | 7/2002 | Salas et al. | 705/59 |
| 2002/0174180 A1 | 11/2002 | Brown et al. | |
| 2002/0174372 A1 | 11/2002 | Venkataraman | |
| 2003/0018629 A1 * | 1/2003 | Namba | 707/3 |
| 2004/0199507 A1 | 10/2004 | Tawa | |
| 2005/0073991 A1 | 4/2005 | Roberts et al. | |
| 2005/0088690 A1 | 4/2005 | Haneda et al. | |
| 2007/0150470 A1 * | 6/2007 | Brave et al. | 707/6 |

FOREIGN PATENT DOCUMENTS

| | | |
|---|---|---|
| JP | 2000268164 | 9/2000 |
| JP | 2001325280 | 11/2001 |
| WO | 2004068469 | 8/2004 |

OTHER PUBLICATIONS

Klingberg et al, Gnutella 0.6, HTML, 2002, sourceforge.net, Available: http://rfc-gnutella.sourceforge.net/src/rfc-0_6-draft.html (Accessed: May 19, 2008).*

(Continued)

*Primary Examiner* — Jason Liao
(74) *Attorney, Agent, or Firm* — John L. Rogitz (57) ABSTRACT

A method of providing a user access to data files distributed in a plurality of different types of user devices is described. According to the method, a copy of data files stored locally at each user device is received at a server via a respective network communication link. Index information is generated based on the received data files. The index information facilitates performing a search operation using user-provided search information to select any of the data files. If a selected data file from the search operation is not stored locally at a desired user device, a copy of the selected data file is sent from the server via the respective network communication link to provide the user access to the selected data file at the desired user device.

15 Claims, 7 Drawing Sheets

(56) References Cited

OTHER PUBLICATIONS

Singla et al., Ultrapeers: Another Step towards Gnutella Scalability, 2002, Google Cache of limewire.com, Available: http://209.85.215.104/search?q=cache:3zmm8AdzcNQJ:www.limewire.com/developer/Ultrapeers.html+Ultrapeer+developer+limewire&hl=en&ct=clnk&cd=1&gl=us (Accessed: May 19, 2008).*

Rohrs et al, Query Routing for the Gnutella Network, 2002, Google Cache of limewire.com, Available: http://209.85.215.104/search?q=cache:QKorlApL8AQJ:www.limewire.com/developer/query_routing/keyword%2520routing.htm+%22query+routing+protocol%22+keyword+routing&hl=en&ct=clnk&cd=2&gl=us (Accessed: May 19, 2008).*

Friedman et al, File Cache Performance and Tuning, 2002, technet.microsoft.com, Available: http://technet.microsoft.com/en-us/library/bb742613.aspx (Accessed: May 20, 2008).*

An Educator's Guide to School Networks, HTML, 1997-99, Florida Center for Instructional Techology, Available: http://fcit.usf.edu/network/chap5/chap5.htm (Verified at archive.org for Feb. 26, 2001).*

Teevan et al, The Perfect Search Is Not Enough: A Study of Orienteering Behavior in Directed Search, Apr. 24-29, 2004, ACM, 415-422.*

Schroeder et al., "A Caching File System for a Programmer's Workstation", 10th Annual Symposium on Operating Systems Principles, Proceedings of the ACM Symposium on Operating Systems Principles, Washington, Dec. 1-4, 1985, pp. 1-22.

Kent, C. A., "Cache Coherence in Distributed Systems", Internet Publication Retrieved from the Internet: URL:http://www.hpl.hp.com/techreports/Compaq-DEC/WRL-87-4.pdf, Dec. 1987, pp. 1-79.

* cited by examiner

PROVIDING A USER ACCESS TO DATA FILES DISTRIBUTED IN A PLURALITY OF DIFFERENT TYPES OF USER DEVICES

BACKGROUND OF THE INVENTION

1. Field of the Invention

Embodiments of the present invention generally relate to data file management. More particularly, embodiments of the present invention relate to providing a user access to data files distributed in a plurality of different types of user devices.

2. Related Art

The marketplace offers a user a variety of user devices. Examples of these user devices include a computer, a digital camera, a portable digital music player, a digital video recorder, a digital television, a cell phone, a game player, etc. A user is able to create various types of data files by using these user devices. Text files, photo files, video files, music files, graphic files, email message files, etc. are some examples of the different types of data files that can be created by the user.

Moreover, these user devices provide the user access to data files from numerous sources. For example, some data files may be imported from legacy devices. Other data files may be received via a wired or a wireless network. Still, other data files may be purchased for use on these user devices.

For various reasons, the user may transfer data files to a high storage capacity user device (e.g., a computer) or to portable storage media (e.g., DVD, CD, memory card, portable hard drive, etc.). Typically, the user creates a hierarchy of folders to store the data files in a meaningful manner for easy access. Moreover, the portable storage media may be placed in numerous places (e.g., desk, bookshelf, closet, briefcase, pocket of clothes, etc.).

In the end, the user's data files are scattered in multiple user devices and portable storage media. This prevents the user from easily accessing the data files because of several reasons. The user may not know or remember where a specific data file is stored. Moreover, the user may not know what data files are available in the multiple user devices and portable storage media. Management of these data files gets worse as the user creates new data files and obtains additional user devices and portable storage media.

SUMMARY OF THE INVENTION

A method of providing a user access to data files distributed in a plurality of different types of user devices is described. According to the method, a copy of data files stored locally at each user device is received at a server via a respective network communication link. Index information is generated based on the received data files. The index information facilitates performing a search operation using user-provided search information to select any of the data files. If a selected data file from the search operation is not stored locally at a desired user device, a copy of the selected data file is sent from the server via the respective network communication link to provide the user access to the selected data file at the desired user device.

In an embodiment, a server comprises a network communication unit, a data storage, and a user device interface. The data storage is for storing data files and index information that facilitates performing a search operation using user-provided search information to select any of the data files. Further, the user device interface is adapted to facilitate receiving via the network communication unit the stored data files representing a copy of data files stored locally at each of a plurality of different types of user devices and is adapted to generate the index information based on the stored data files.

In yet another embodiment, a user device comprises a network communication unit, a data storage, and a local user interface. The data storage is for storing data files and index information that facilitates performing a search operation using user-provided search information to select any of the data files and to select from data files that are stored in a server and represent a copy of data files received from each of a plurality of different types of user devices. Further, the local user interface is adapted to facilitate sending via the network communication unit a copy of the stored data files to the server, is adapted to receive via the network communication unit the index information from the server, and is adapted to enable a user to perform the search operation.

BRIEF DESCRIPTION OF THE DRAWINGS

The accompanying drawings, which are incorporated in and form a part of this specification, illustrate embodiments of the invention and, together with the description, serve to explain the principles of the present invention.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

In contrast to the data file management problems discussed above, the present invention is directed to providing a user access to data files distributed in a plurality of different types of user devices. Each user device provides the user index information corresponding to the data files available in the various user devices instead of providing the user the data files available in a single user device. Search operations are performed on the index information to find a specific data file.

A copy of data files stored at each user device is sent to a server, which generates the index information and provides a centralized storage location for supplying specific data files to user devices in response to the user's search results.

Figure 1:
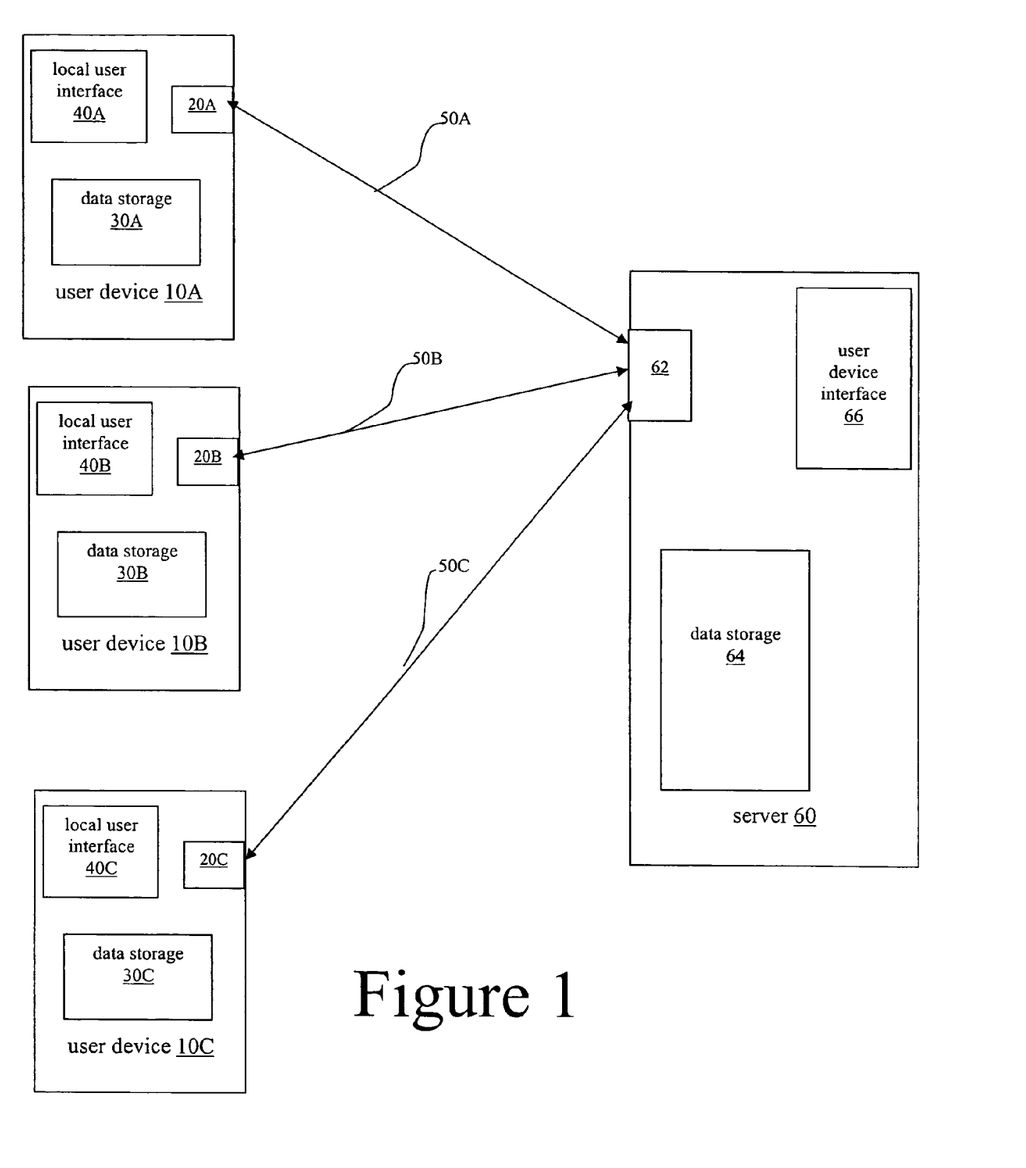
FIG. 1 illustrates a system in accordance with an embodiment of the present invention.

FIG. 1 illustrates a system 100 in accordance with an embodiment of the present invention. The system 100 includes a server 60 and a plurality of user devices 10A, 10B, and 10C. Examples of user devices include a computer, a digital camera, a portable digital music player, a digital video recorder, a digital television, a cell phone, a game player, etc. It should be understood that the system 100 may have other configurations and other number of servers and user devices.

Each user device 10A, 10B, and 10C includes a network communication unit 20A, 20B, and 20C; a data storage 30A, 30B, and 30C; and a local user interface 40A, 40B, and 40C. Moreover, the server 60 has a network communication unit 62, a data storage 64, and a user device interface 66. Each user device 10A, 10B, and 10C is able communicate with the server 60 via a respective network communication link 50A, 50B, and 50C. The network communication link may be wired or wireless.

Focusing on the server 60, the data storage 64 stores data files and index information that facilitates performing a search operation using user-provided search information to select any of the data files. Text files, photo files, video files, music files, graphic files, email message files, etc. are some examples of data files.

The user device interface 66 is adapted to facilitate receiving via the network communication unit 62 the stored data files which represent a copy of data files stored locally at user devices 10A, 10B, and 10C. Moreover, the user device interface 66 is adapted to generate the index information based on the data files stored in the data storage 64. The index information enables organization and identification of the data files in the data storage 64. Further, the index information enables location of the data files in the data storage 64. Any of the data files may include one or more user-specified search tags for use in the search operation. These user-specified search tags may be included in the index information. For example, the user may specify the search tag "birthday" to several music files to identify music to play at a birthday party. The user device interface 66 sends via the network communication unit 62 the index information to each user device 10A, 10B, and 10C for storing locally and enabling the user to perform at any user device 10A, 10B, and 10C the search operation to select any of the data files.

In another embodiment, the user device interface 66 sends the index information to a portion of the user devices (e.g., 10A and 10B) for storing locally and enabling the user to perform at user devices 10A and 10B the search operation to select any of the data files since memory capacity or other reason may prevent a user device (e.g., 10C) from receiving the index information. Since user device 10C does not receive the index information, the user device 10C communicates with the server 60 and utilizes the server 60 to perform the search operation on the index information stored by the server 60. For example, the user device interface 66 may facilitate this search operation.

Continuing, the user device interface 66 is adapted to send via the network communication unit 62 a copy of a selected data file from the search operation performed by the user to a desired user device 10A, 10B, or 10C to provide the user access to the selected data file at the desired user device 10A, 10B, or 10C if the selected data file is not stored locally at the desired user device 10A, 10B, or 10C. Also, the user device interface 66 updates the index information in response to a change in data files stored locally at data storage 30A, 30B, and 30C of respective user devices 10A, 10B, and 10C. Moreover, the user device interface 66 is adapted to propagate the change to the data storage 64 and is adapted to send via the network communication unit 62 the updated index information to each user device 10A, 10B, and 10C for storing locally.

Now focusing on the user devices 10A, 10B, and 10C, each data storage 30A, 30B, and 30C stores data files and index information generated by the server 60. The index information facilitates performing a search operation using user-provided search information to select any of the data files stored locally and to select from data files that are stored in the server 60 and that represent a copy of data files received from other user devices.

In the embodiment where a portion of the user devices (e.g., 10A and 10B) receive and locally store the index information, the local user interface (e.g., 40C) of the user device (e.g., 10C) that does not receive the index information is adapted to enable a user to use the server 60 to perform the search operation.

Each local user interface 40A, 40B, and 40C is adapted to facilitate sending via the respective network communication unit 20A, 20B, and 20C to the server 60 a copy of the data files stored in the respective data storage 30A, 30B, and 30C, Moreover, each local user interface 40A, 40B, and 40C is adapted to receive via the respective network communication unit 20A, 20B, and 20C the index information from the server 60. Also, each local user interface 40A, 40B, and 40C is adapted to enable a user to perform the search operation at the respective user device 10A, 10B, and 10C.

Continuing, each local user interface 40A, 40B, and 40C is adapted to retrieve from the server 62 via the respective network communication unit 20A, 20B, and 20C a copy of a selected data file from the search operation to provide the user access to the selected data file if the selected data file is not stored in the respective data storage 30A, 30B, and 30C. Further, each local user interface 40A, 40B, and 40C provides the user access to the selected data file from the search operation if the selected data file is stored in the respective data storage 30A, 30B, and 30C. Also, each local user interface 40A, 40B, and 40C enables a change to the respective data storage 30A, 30B, and 30C to propagate to the server 60 and receives via the respective network communication unit 20A, 20B, and 20C updated index information to store in the respective data storage 30A, 30B, and 30C. In an embodiment, the change to the respective data storage 30A, 30B, and 30C propagates to the server 60 as a background process in the respective user device 10A, 10B, and 10C.

Furthermore, each local user interface 40A, 40B, and 40C enables the user to specify preferences with respect to data file management in view of the storage capacity of the respective data storage 30A, 30B, and 30C. For example, the user may specify that data files be sent to the server 60 and be deleted from the respective data storage 30A, 30B, and 30C under various conditions. Also, the user may specify that copies of data files be retrieved from the server 60 and stored in the respective data storage 30A, 30B, and 30C under various conditions. In an embodiment, each local user interface 40A, 40B, and 40C utilizes an algorithm to identify patterns in the user's usage of data files to allow the automatic retrieval of data files from the server 60.

Figure 2:
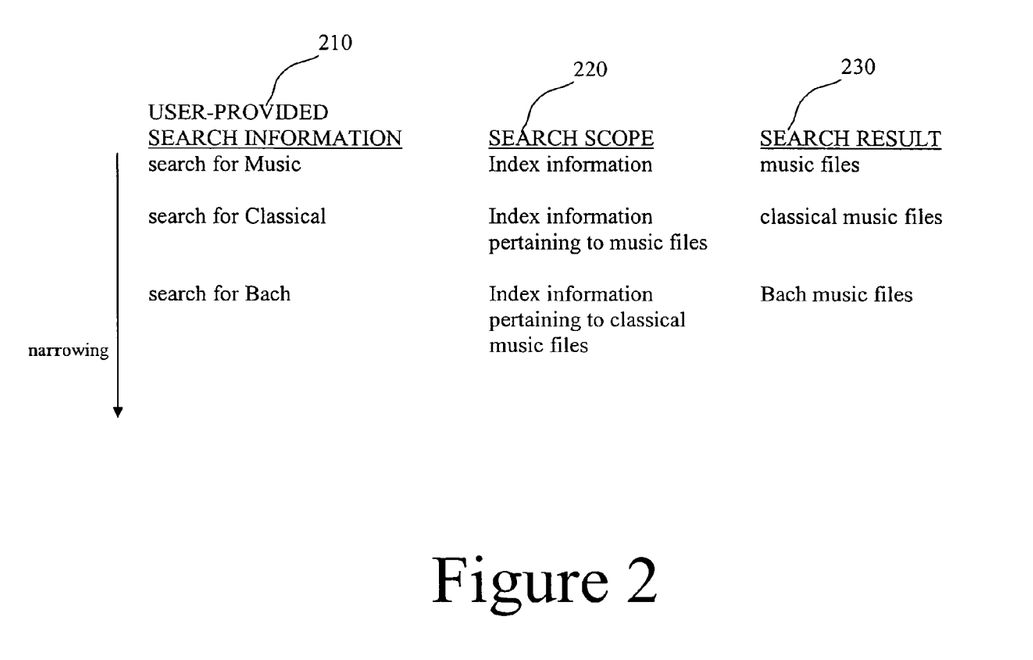
FIG. 2 illustrates use of search operations to provide a virtual hierarchy in accordance with an embodiment of the present invention.

FIG. 2 illustrates use of search operations to provide a virtual hierarchy in accordance with an embodiment of the present invention. Column 210 represents user-provided search information. Column 220 represents the search scope. Column 230 represents the search result. Instead of the user browsing a hierarchy of folders and directories to search for a specific data file, the user performs one or more search operations, where each search operation narrows the search result until the specific data file is found. This series of narrowing searches is a virtual hierarchy. Since the index information is based on the data files from the various user devices, it is sufficient to perform at any one of the user devices the search using the index information to find a specific data file without needing to perform separate searches on the various user devices.

As depicted in FIG. 2, the user-provided search information begins with "Music" and narrows to "Bach". Moreover, the search scope of the next search is narrowed by the previous search until the specific data file is found.

Figure 3:
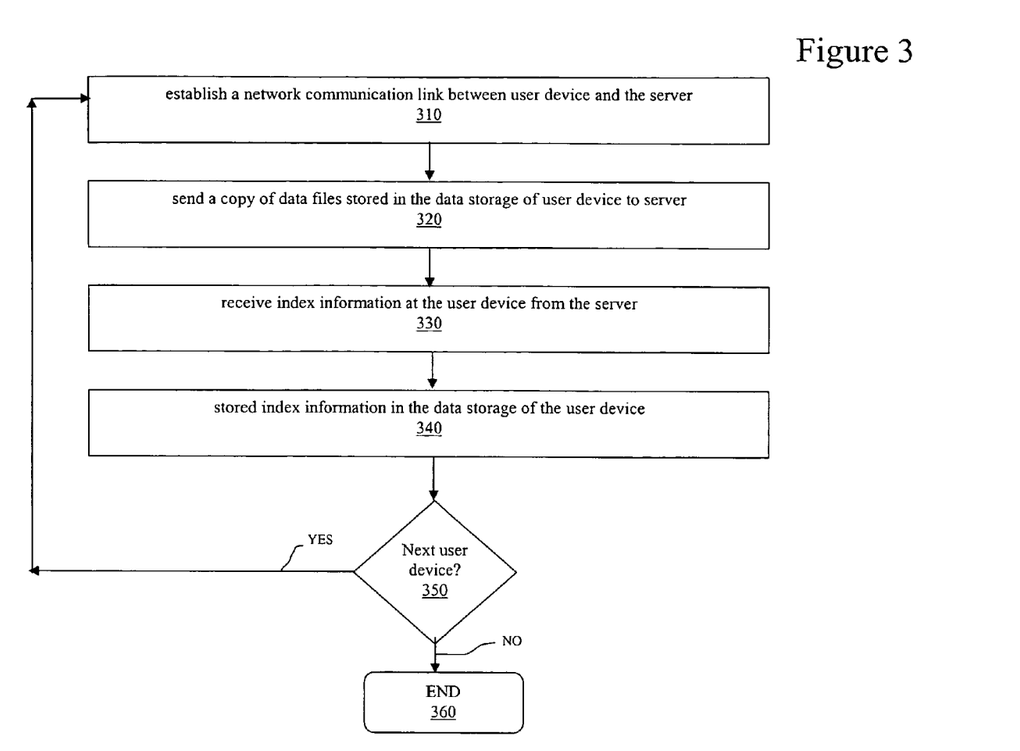
FIG. 3 illustrates a flow chart showing aggregation of data files from the perspective of user devices of FIG. 1 in accordance with an embodiment of the present invention.

FIG. 3 illustrates a flow chart showing aggregation of data files from the perspective of user devices of FIG. 1 in accordance with an embodiment of the present invention.

At Block 310, a user device (e.g., user device 10A) establishes a network communication link 50A with the server 60. The user device 10A sends a copy of data files stored in the data storage 30A to the server 60, at Block 320. Further, at Block 330, the user device 10A receives index information from the server 60. The index information is stored in the data storage 30A, at Block 340.

Continuing, at Block 350, if there is a next user device, the next user device (e.g., user device 10B or user device 10C) proceeds with Blocks 310-340. Otherwise, the flow chart ends at Block 360.

Now, the data storage 64 of the server 60 stores copies of the data files of the user devices 10A, 10B, and 10C. Moreover, the data storage 64 stores updated index information based on data files from the user devices 10A, 10B, and 10C.

A pull technique or a push technique may be utilized to get the most updated index information to the user devices 10A, 10B, and 10C. Each of these techniques depends on the availability of the respective network communication link 50A, 50B, and 50C. The objective is to distribute the updated index information in a timely manner.

Figure 4:
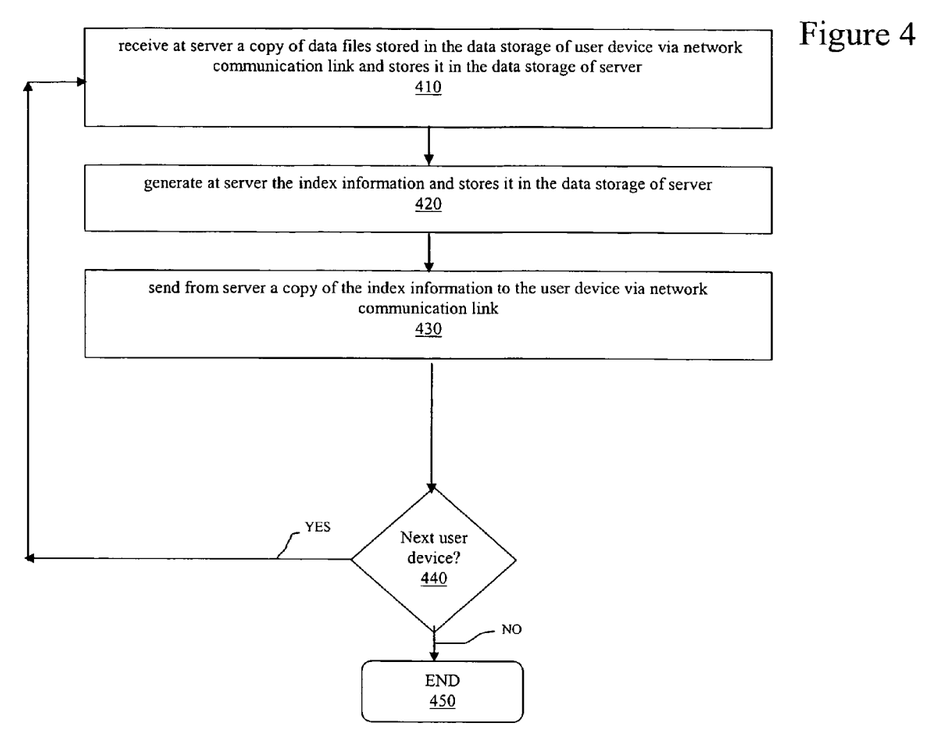
FIG. 4 illustrates a flow chart showing aggregation of data files from the perspective of the server of FIG. 1 in accordance with an embodiment of the present invention.

FIG. 4 illustrates a flow chart showing aggregation of data files from the perspective of the server 60 of FIG. 1 in accordance with an embodiment of the present invention. It is assumed that user device 10A is the first to send a copy of its data files.

The server 60 receives a copy of data files stored in the data storage 30A of user device 10A via network communication link 50A and stores it in its data storage 64, at Block 410. Further, at Block 420, the server 60 generates the index information and stores it in its data storage 64. The server 60 sends a copy of the index information to the user device 10A via network communication link 50A, at Block 430.

Continuing, at Block 440, if there is a next user device (e.g., user device 10B or user device 10C), the server 60 proceeds with Blocks 410-430. Otherwise, the flow chart ends at Block 450.

Now, the data storage 64 of the server 60 stores copies of the data files of the user devices 10A, 10B, and 10C. Moreover, the data storage 64 stores updated index information based on data files from the user devices 10A, 10B, and 10C.

A pull technique or a push technique may be utilized to get the most updated index information to the user devices 10A, 10B, and 10C. Each of these techniques depends on the availability of the respective network communication link 50A, 50B, and 50C. The objective is to distribute the updated index information in a timely manner.

Figure 5:
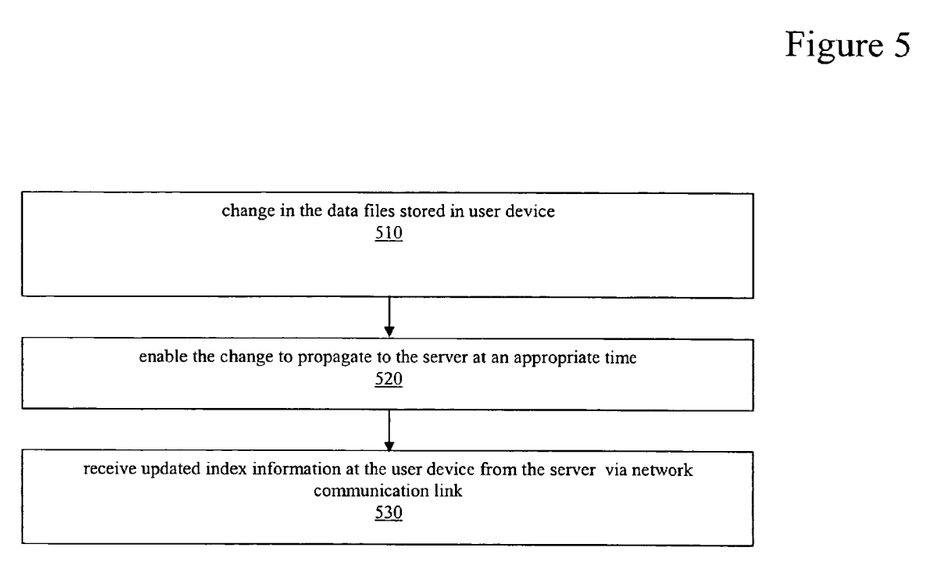
FIG. 5 illustrates a flow chart showing propagation of a change to data files from the perspective of user devices of FIG. 1 in accordance with an embodiment of the present invention.

FIG. 5 illustrates a flow chart showing propagation of a change to data files from the perspective of user devices of FIG. 1 in accordance with an embodiment of the present invention. It is assumed that there is a change in the data files stored in user device 10A.

There is a change in the data files stored in user device 10A, at Block 510. Examples of change include a new data file is stored, an existed data file is modified, a data file is deleted locally but is retained in the server 60, a data file is deleted locally and is deleted from the server 60, etc. Further, at Block 520, the user device 10A enables the change to propagate to the server 60 at an appropriate time. In an embodiment, the change propagates as a background process in the user device 10A. Updated index information is received at the user device 10A from the server 60 via network communication link 50A, at Block 530.

A pull technique or a push technique may be utilized to get the updated index information to the user devices 10B and 10C. Each of these techniques depends on the availability of the respective network communication link 50B and 50C. The objective is to distribute the updated index information in a timely manner.

Figure 6:
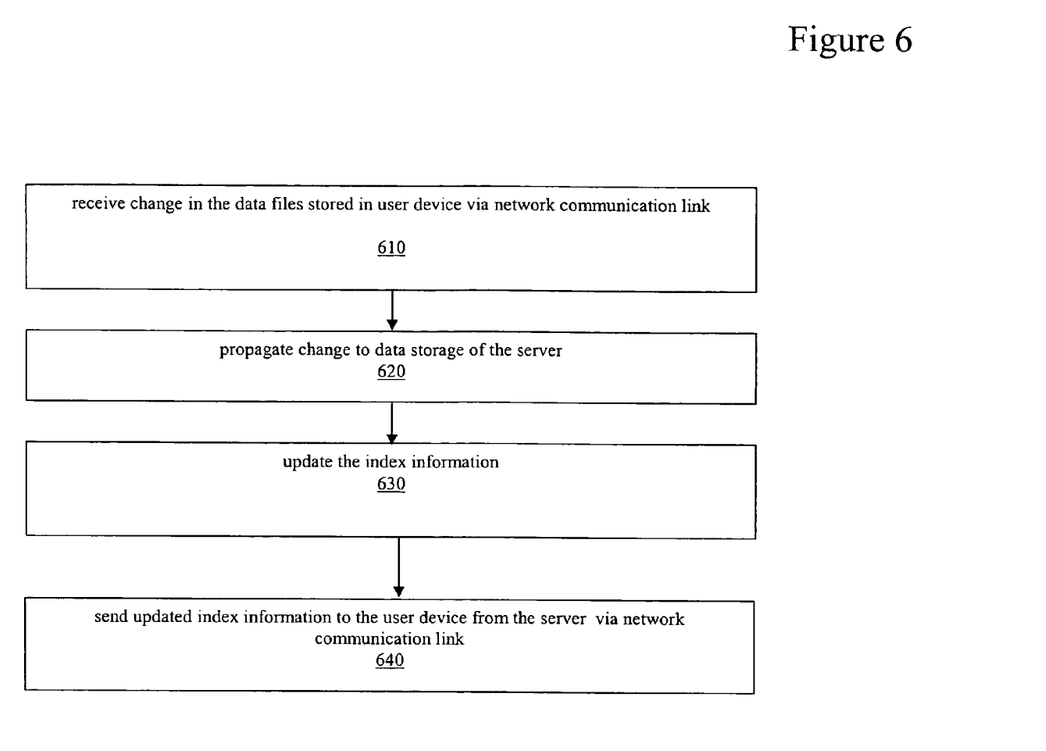
FIG. 6 illustrates a flow chart showing propagation of a change to data files from the perspective of the server of FIG. 1 in accordance with an embodiment of the present invention.

FIG. 6 illustrates a flow chart showing propagation of a change to data files from the perspective of the server of FIG. 1 in accordance with an embodiment of the present invention. It is assumed that there is a change in the data files stored in user device 10A.

The change in the data files stored in user device 10A is received at the server 60 via network communication link 50A, at Block 610. Examples of change include a new data file is stored, an existed data file is modified, a data file is deleted locally but is retained in the server 60, a data file is deleted locally and is deleted from the server 60, etc. Further, at Block 620, the server 60 propagates the change to its data storage 64. The index information is updated, at Block 630. Moreover, at Block 640, the updated index information is sent to the user device 10A from the server 60 via network communication link 50A.

A pull technique or a push technique may be utilized to get the updated index information to the user devices 10B and 10C. Each of these techniques depends on the availability of the respective network communication link 50B and 50C. The objective is to distribute the updated index information in a timely manner.

Figure 7:
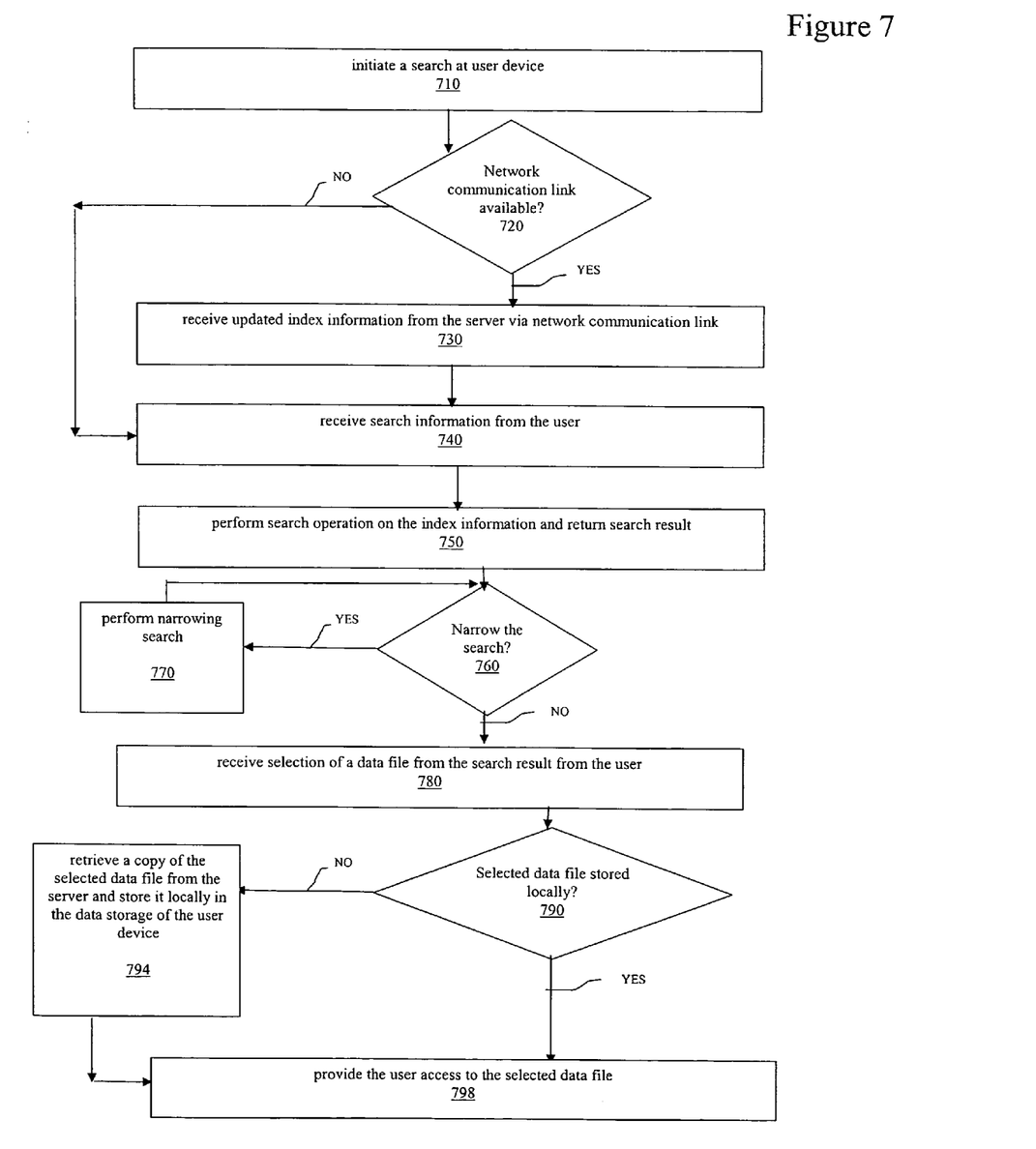
FIG. 7 illustrates a flow chart showing search for a specific data file from the perspective of user devices of FIG. 1 in accordance with an embodiment of the present invention.

FIG. 7 illustrates a flow chart showing search for a specific data file from the perspective of user devices of FIG. 1 in accordance with an embodiment of the present invention. It is assumed that the user performs the search at user device 10A.

At Block 710, the user initiates a search at user device 10A. Continuing, at Block 720, if the network communication link 50A is available, the flow chart proceeds to Block 730. Otherwise, the flow chart proceeds to Block 740.

Continuing, at Block 730, the user device 10A receives updated index information from the server 60 via network communication link 50A. At Block 740, search information is received from the user. A search operation is performed on the index information and a search result is returned, at Block 750.

Further, at Block 760, if the search result is to be narrowed, the flow chart proceeds to Block 770 and then returns to Block 760. Otherwise, the flow chart proceeds to Block 780. A narrowing search is performed, at Block 770.

At Block 780, selection of a data file from the search result is received from the user. At Block 790, if the selected data file is not stored locally in the data storage 30A, the flow chart proceeds to Block 794. Otherwise, the flow chart proceeds to Block 798. A copy of the selected data file is retrieved from the server 60 and stored locally in the data storage 30A, at Block 770. Furthermore, at Block 798, the user is provided access to the selected data file.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of providing a user access to data files distributed in a plurality of different types of user devices, said method comprising:
    receiving at a server a cop of data files stored locally in a hierarchy of folders and directories at each user device via a respective network communication link;
    generating index information based on said received data files, wherein said index information facilitates performing a series of narrowing search operations on said index information using user-provided search information to select any of said data files and to avoid searching said hierarchies of folders and directories of said user devices to select any of said data files; and
    if a selected data file from said search operation is not stored locally at a desired user device, sending a copy of said selected data file from said server via said respective network communication link to provide said user access to said selected data file at said desired user device.

2. The method as recited in claim 1 further comprising:
    if said selected data file from said search operations is stored locally at said desired user device, providing said user access to said selected data file at said desired user device.

3. The method as recited in claim 1 further composing:
    updating said index information in response to a change in data files stored locally at any of said user devices, wherein said server is utilized to perform said search operations.

4. The method as recited in claim 3 wherein said updating comprises:
    propagating said change to said server; and
    sending said updated index information to each user device for storing locally via said respective network communication link.

5. The method as recited in claim 1 further comprising:
    sending said index information to each user device for storing locally via said respective network communication link;
    enabling said user to perform at said desired user device said search operations to select any of said data files.

6. The method as recited in claim 1 further comprising:
    enabling said user to specify one or more search tags for any of said data files for use in said search operations.

7. The method as recited in claim 1 further comprising:
    enabling said user to specify preferences for each user device with aspect to data file management in view of storage capacity of each user device.

8. A server comprising:
    a network communication unit;
    a data storage for storing data files and index into information that facilitates performing a series of narrowing search operations on said index information using user-provided search information to select any of said data files; and
    a user device interface adapted to facilitate receiving via said network communication unit said stored data files representing a copy of data files stored locally in a hierarchy of folders and directories at each of a plurality of different types of user devices and adapted to generate said index information based on said stored data files to avoid searching said hierarchies of folders and directories of said user devices to select any of said data files.

9. The server as recited in claim 8 wherein s aid user device interface is adapted to send via said network communication unit a copy of a selected data file from said search operations to a desired use device to provide a user access to said selected data file at said desired user device if said selected data file is not stored locally at said desired user device.

10. The server as recite in claim 8 wherein said user device interface is adapted to update said index information in response to a change in data files stored locally at any of said user devices.

11. The server as recited in claim 10 wherein said user device interface is adapted to propagate said change to said data storage and is adapted to send via said network communication unit said updated index information to each user device for storing locally.

12. The server as recited in claim 10 wherein said user device interface is adapted to propagate said change to said data storage and is adapted to send via said network communication unit said updated index information to a portion of said user devices for storing locally.

13. The server as recited in claim 8 wherein said user device interface is adapted to send via said network communication unit said index information to each user device for storing locally and enabling said user to perform at an user device said search operations to select any of said data files.

14. The server as recited in claim 8 wherein said user device interface is adapted to send via said network communication unit said index information to a portion of said user devices to enable said user to perform at any user device having said index information said search operations to select any of said data files, and adapted to enable said user to utilize said server to perform said search operations.

15. The server as recited in claim $ wherein any of said data files includes one or more user-specified search tags for use in said search operations.

* * * * *